No. 758,635. PATENTED MAY 3, 1904.
W. H. FOOT.
DIRECT CURRENT GENERATOR.
APPLICATION FILED SEPT. 16, 1903.
NO MODEL. 2 SHEETS—SHEET 1.

WITNESSES:
C. L. Belcher
F. H. Miller

INVENTOR
William H. Foot
BY
Wesley L. Carr
ATTORNEY

No. 758,635. PATENTED MAY 3, 1904.
W. H. FOOT.
DIRECT CURRENT GENERATOR.
APPLICATION FILED SEPT. 16, 1903.
NO MODEL. 2 SHEETS—SHEET 2.

WITNESSES:
C. L. Belcher
F. H. Miller

INVENTOR
William H. Foot
BY
Wesley G. Carr
ATTORNEY

No. 758,635. Patented May 3, 1904.

UNITED STATES PATENT OFFICE.

WILLIAM H. FOOT, OF WILKINSBURG, PENNSYLVANIA, ASSIGNOR TO WESTINGHOUSE ELECTRIC & MANUFACTURING COMPANY, A CORPORATION OF PENNSYLVANIA.

DIRECT-CURRENT GENERATOR.

SPECIFICATION forming part of Letters Patent No. 758,635, dated May 3, 1904.

Application filed September 16, 1903. Serial No. 173,483. (No model.)

*To all whom it may concern:*

Be it known that I, WILLIAM H. FOOT, a subject of the King of Great Britain, residing at Wilkinsburg, in the county of Allegheny and State of Pennsylvania, have invented a new and useful Improvement in Direct-Current Generators, of which the following is a specification.

My invention relates to dynamo-electric machines; and it has for one of its objects to provide a simple, practical, and inexpensive means for transforming a two-wire generator into a three-wire generator without reconstructing the essential parts of the machine and in such manner that it may be restored to its original condition for supplying a two-wire circuit readily and without great expense or disturbance of the essential portions of the mechanism.

Another object of my invention is to provide balancing connections for the armature-circuits of either two or three wire machines which may be easily and inexpensively applied and which will be readily accessible for inspection and repairs.

In a patent to Michael von Dolivo-Dobrowolsky, No. 513,006, granted January 16, 1894, is shown and described a dynamo-electric machine in which autotransformer or reactive coils are utilized in connection with a single direct-current generator for supplying three-wire distributing-circuits, and one use of my invention is in connection with such machines. It is obviously necessary, as set forth in the said patent, to either embody the autotransformer or reactive coils in the armature structure so that they will rotate therewith or, if stationary coils are employed, it is necessary to provide slip-rings and brushes for connecting said coils in circuit with the armature-winding. Since it is one of the primary objects of my invention to equip a standard direct-current machine with means for supplying a three-wire distributing-circuit without disarranging the machine structure, it is not feasible to embody the reactive coils in the armature. I have accordingly devised the means shown in the accompanying drawings, in which—

Figure 1:
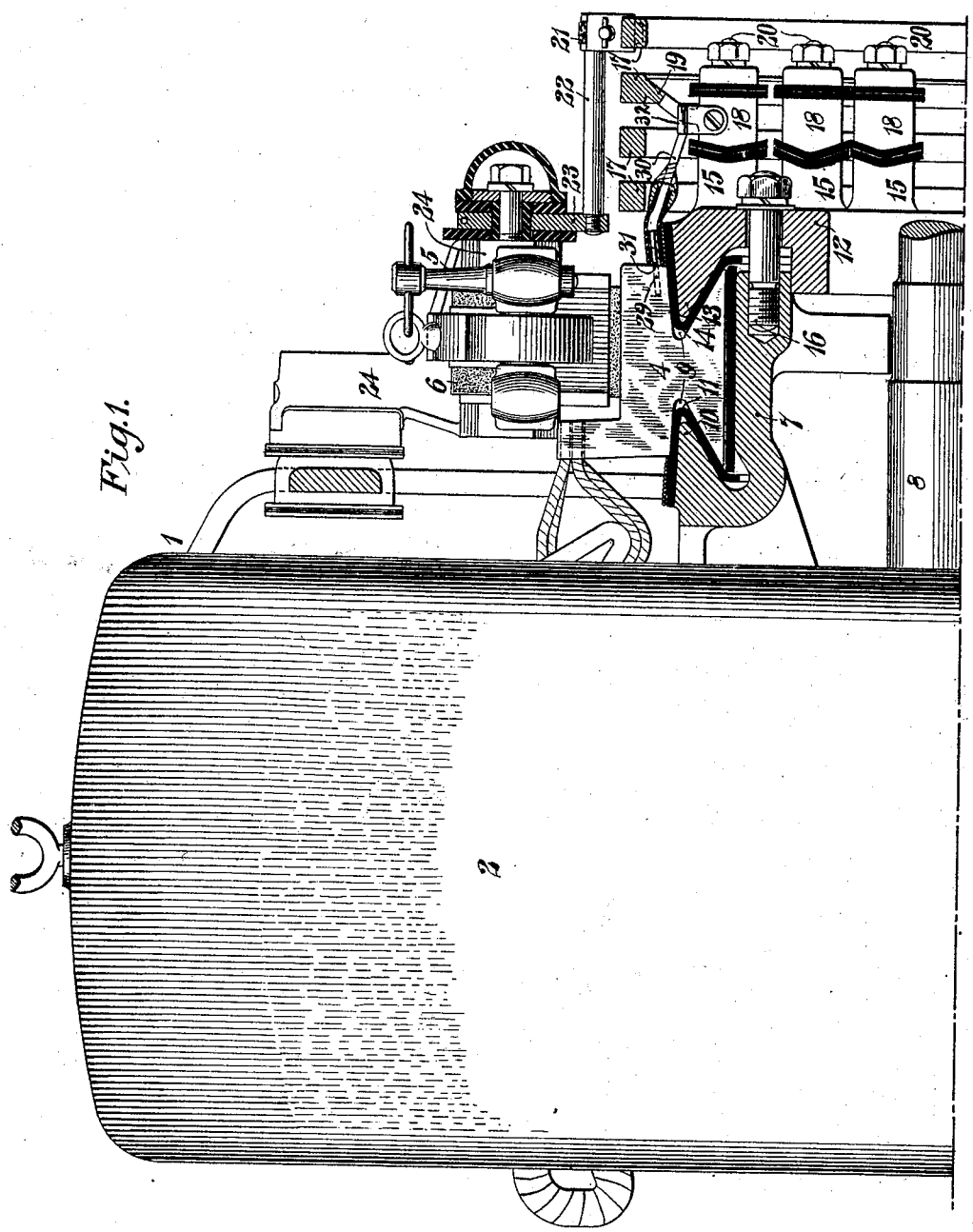
Figure 2:
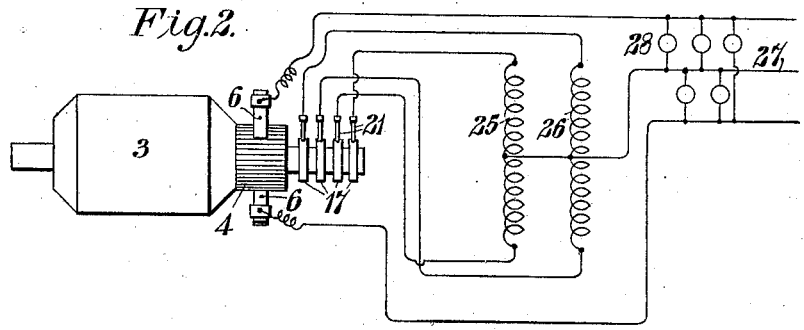
Figure 3:
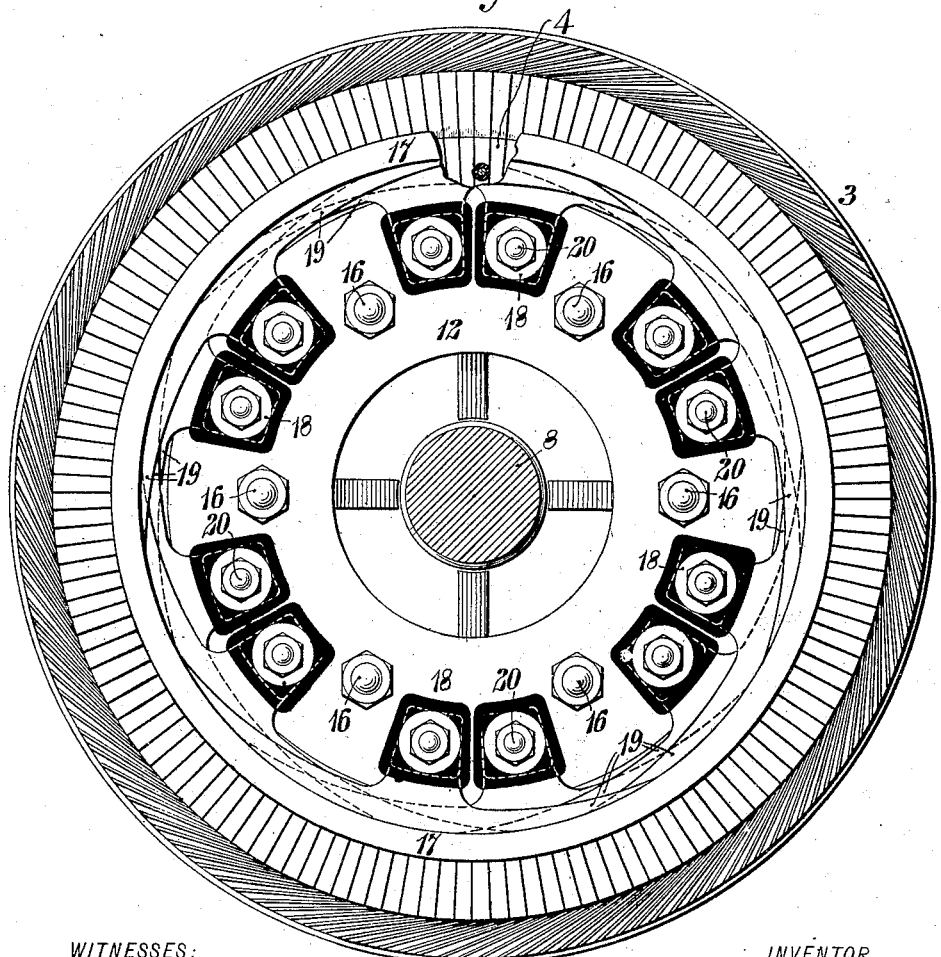

Figure 1 is a view in side elevation of a portion of a direct-current generator, the commutator and my attachments being shown in section. Fig. 2 is a diagram of the armature and reactive-coil circuits of a machine equipped with my attachment; and Fig. 3 is an end elevation of the collector-rings and commutator-cylinder shown in Fig. 1, a small portion of the collector-rings being broken away to show a connection to a commutator-bar.

The generator 1 comprises the usual field-magnet frame 2 and armature 3, commutator-cylinder 4, brush-holders 5, and brushes 6, the commutator-cylinder and armature being mounted upon a spider 7, which is in turn rigidly supported by a shaft 8. As is usual in machines of this character the commutator-cylinder 4 is provided with front and rear annular recesses 9, that are of approximately V shape in cross-section, the rear recess 9 receiving a correspondingly-shaped projection 10, with which the spider 7 is provided, suitable insulation 11 being interposed between the projection and the walls of the recess. The recess at the front end of the commutator-cylinder receives a similarly-shaped annular projection on a clamping-ring or end plate which is securely fastened to the end of the spider. The end clamping-ring just referred to is not shown in the present drawings, since it is the one element that is replaced by one of the features of my improvement. This replacing device is a clamping-ring 12, having an annular projection 13, that is of approximately V shape in cross-section and fits into the front recess 9 and is insulated therefrom by suitable material 14. This clamping-ring 12 is provided with a series of laterally-projecting studs or bosses 15 and is securely clamped to the spider by means of bolts 16. The collector-rings 17 are also provided with bosses 18, which are mounted upon the ends of suitable arms 19, and these bosses are clamped to the ends of the bosses 15 by means of bolts 20. The structural features of these collector-rings and their bosses are not shown in full detail; but reference may be had to Patent No. 702,599, granted June 17, 1902, to the Westinghouse Electric & Manufacturing Company as assignee of Robert Siegfried, for any desired illustration and description thereof which is not embodied herein.

The brushes 21 to engage the rings 17 may be mounted upon a rod 22, which projects laterally from an arm or plate 23, that is bolted to the bracket 24, which supports the brush-holders 5. The brushes 21 are connected to the ends of the transformer or reactance coils 25 and 26, and the middle points of such coils are connected to the neutral or balancing conductor 27 of the distributing-circuit 28.

The connections between the rings 17 and the armature-winding may be made through the proper bars of the commutator-cylinder by tapping the ends of such bars and driving pins 29 into the holes thus made. The projecting ends of the pins 29 are connected to the bosses of the proper rings 17 by means of conductors 30, coupling-sleeves 31, and terminal ears or clips 32.

When my invention is utilized solely for balancing the armature-circuits, as set forth in Patent No. 573,009, granted to the Westinghouse Electric & Manufacturing Company December 15, 1896, as assignee of B. G. Lamme, the brushes and balancing-coils may be either omitted or disconnected from the rings 17. It will be also understood that the number, form, and dimensions of rings may be varied to any desired extent from what is shown.

It will be seen from the illustration and the foregoing description that a standard direct-current machine for supplying two-wire systems of distribution may be readily converted into a machine for supplying three-wire circuits by making only such alterations in the machine structure as may be inexpensively and expeditiously effected and that if it is desired at any time to remove the neutral-wire attachments such removal may be effected and the originally-removed parts be restored in place thereof and the machine be then placed in as serviceable condition as it was originally and also in such condition that its appearance is not materially altered from that which it presented when originally built. It will also be seen that the means for mechanically supporting the cross-connecting rings and the means for electrically connecting them to the armature-winding are both simple and serviceable and are readily accessible for such attention as may be required.

I claim as my invention—

1. A dynamo-electric machine having a commutator clamping-ring provided with a plurality of laterally-projecting studs or bosses and a plurality of conducting-rings bolted to said studs or bosses.

2. A commutator-cylinder for dynamo-electric machines having a clamping-ring provided with laterally-projecting bosses or studs, in combination with a plurality of conducting-rings bolted to said bosses or studs.

3. In a dynamo-electric machine, a spider, commutator-bars mounted thereon, a clamping-ring having outwardly-projecting studs or bosses and bolted to said spider and a plurality of conducting-rings having bosses that are bolted to the clamping-ring bosses.

4. In a dynamo-electric machine, the combination with a commutator and a clamping-ring therefor, of a plurality of conducting-rings fastened to said clamping-ring and electrical connections between said rings and certain of the commutator-bars.

5. In a dynamo-electric machine, the combination with a commutator, of cross-connecting rings adjacent to the outer end of the commutator and conductors tapped into the ends of certain of the commutator-bars and connected to said rings.

6. In a dynamo-electric machine, the combination with a commutator and a set of conducting-rings mechanically connected thereto, of pins tapped into the outer ends of a plurality of commutator-bars and wires connecting said pins to corresponding rings of the set.

7. In a dynamo-electric machine, the combination with a commutator having an outer clamping-ring provided with bosses, of a set of conducting-rings fastened to said bosses, and conductors tapped into the outer ends of certain of the commutator-bars and connected to corresponding rings of the set.

8. In a dynamo-electric machine, the combination with an armature and a commutator therefor, of a plurality of balancing-coils, a set of rings supported adjacent to the outer end of the commutator, conductors tapped into the outer ends of appropriate commutator-bars and connected to corresponding rings of the set and brushes engaging said rings and connected to said coils.

In testimony whereof I have hereunto subscribed my name this 9th day of September, 1903.

WILLIAM H. FOOT.

Witnesses:
P. A. YOUNG,
BIRNEY HINES.